US008585544B2

(12) United States Patent
Honda (10) Patent No.: US 8,585,544 B2
(45) Date of Patent: Nov. 19, 2013

(54) DRIVE FORCE CONTROL SYSTEM (75) Inventor: Tomoyuki Honda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 207 days.

(21) Appl. No.: 13/147,369

(22) PCT Filed: Mar. 9, 2009

(86) PCT No.: PCT/JP2009/054444
§ 371 (c)(1),
(2), (4) Date: Aug. 2, 2011

(87) PCT Pub. No.: WO2010/103606
PCT Pub. Date: Sep. 16, 2010

(65) Prior Publication Data
US 2011/0312469 A1 Dec. 22, 2011

(51) Int. Cl.
*F16H 61/662* (2006.01)
(52) U.S. Cl.
USPC .................. 477/46; 477/37; 477/44; 477/45
(58) Field of Classification Search
USPC ....................................... 477/37–50
See application file for complete search history.

(56) References Cited

U.S. PATENT DOCUMENTS

| 6,875,152 | B2* | 4/2005 | Iwatuki et al. ................. 477/44 |
|---|---|---|---|
| 2001/0044358 | A1* | 11/2001 | Taniguchi et al. .............. 477/44 |
| 2004/0116245 | A1* | 6/2004 | Yamamoto et al. ............. 477/46 |
| 2004/0242370 | A1* | 12/2004 | Iwatsuki et al. ................ 477/45 |
| 2005/0080536 | A1* | 4/2005 | Yamaguchi et al. ............ 477/37 |
| 2006/0080018 | A1 | 4/2006 | Shimada et al. |
| 2008/0009390 | A1* | 1/2008 | Tanaka et al. ................... 477/45 |
| 2009/0043468 | A1* | 2/2009 | Kondo et al. ................... 477/37 |
| 2009/0176618 | A1* | 7/2009 | Inoue .............................. 477/44 |
| 2012/0108390 | A1* | 5/2012 | Doihara et al. ................. 477/46 |
| 2012/0135837 | A1* | 5/2012 | Waku et al. ..................... 477/45 |
| 2012/0244993 | A1* | 9/2012 | Ishida et al. .................... 477/39 |

FOREIGN PATENT DOCUMENTS

| JP | A-05-065843 | 3/1993 |
|---|---|---|
| JP | A-06-171399 | 6/1994 |
| JP | A-2001-041065 | 2/2001 |

(Continued)

OTHER PUBLICATIONS

Oct. 27, 2011 International Preliminary Report on Patentability issued in International Patent Application No. PCT/JP2009/054444.

(Continued)

*Primary Examiner* — Derek D Knight
(74) *Attorney, Agent, or Firm* — Oliff & Berridge, PLC (57) ABSTRACT

A drive force control system includes a shifting demand judging means that judges whether or not a torque capacity of the clutch is relatively high, and a condition for changing the speed change ratio of the continuously variable transmission stepwise is satisfied; and a first shifting means that reduces the torque capacity of the clutch before changing the speed change ratio of the continuously variable transmission, to synchronize a rotational speed of the internal combustion engine with an input speed of the continuously variable transmission to be attained after changing the speed change ratio thereof while changing the speed change ratio of the continuously variable transmission, and to increase the torque capacity of the clutch after changing the speed change ratio of the continuously variable transmission, when changing the speed change ratio of the continuously variable transmission stepwise.

4 Claims, 8 Drawing Sheets

(56) References Cited

FOREIGN PATENT DOCUMENTS

| JP | A-2005-098329 | 4/2005 |
| JP | A-2006-105097 | 4/2006 |
| JP | A-2006-112248 | 4/2006 |
| JP | A-2006-125602 | 5/2006 |

OTHER PUBLICATIONS

International Search Report issued in International Application No. PCT/JP2009/054444 dated May 19, 2009.

* cited by examiner

DRIVE FORCE CONTROL SYSTEM

TECHNICAL FIELD

The present invention relates to a drive force control system for a vehicle in which a continuously variable transmission is connected with an output shaft of an internal combustion engine in a power transmittable manner.

BACKGROUND ART

A drive force control system for a vehicle in which a continuously variable transmission is connected with an output shaft of an internal combustion engine is known in the art. The continuously variable transmission is capable of controlling a speed change ratio between an input speed and an output speed steplessly so that a driving condition of the internal combustion engine can be controlled to improve a fuel economy. An example of the control system for a vehicle in which the continuously variable transmission is connected with the output shaft of the internal combustion engine in a power transmittable manner is disclosed in Japanese Patent Laid-Open No. 2006-125602. According to the teachings of Japanese Patent Laid-Open No. 2006-125602, a belt-type continuously variable transmission is connected with an output shaft of the engine through a torque reversing mechanism provided with a forward clutch functioning as a starting clutch and a reversing brake.

The aforementioned belt-type continuously variable transmission comprises a primary pulley, a secondary pulley, and a belt applied to those pulleys. The primary pulley is provided with a primary pulley, therefore, a speed change ratio of the belt type continuously variable transmission can be controlled continuously by controlling an oil pressure applied to the primary pulley using a hydraulic control unit. Meanwhile, the secondary pulley is connected with a drive wheel through a differential gear and a drive shaft. In addition, according to the teachings of Japanese Patent Laid-Open No. 2006-125602, the vehicle further comprises: an engine controller for controlling the engine electronically; a transmission controller for electronically controlling the hydraulic control unit connected with the torque reversing mechanism and the belt type continuously variable transmission; and sensors connected with the transmission controller.

In the event of starting the vehicle, a torque capacity coefficient is set on the basis of a driving condition of the vehicle, that is, on the basis of a speed ratio of the starting clutch and an opening degree of an accelerator. Therefore, a torque capacity of the starting clutch is controlled on the basis of the torque capacity coefficient and a rotational speed of the engine. Specifically, in case a large acceleration force is demanded by a driver, the torque capacity is corrected to be reduced. For this reason, in case the driver intends to accelerate the vehicle abruptly, the rotational speed of the engine can be raised promptly to a region where a large torque can be generated.

In addition, a control device for engine connected with a transmission is disclosed in Japanese Patent Laid-Open No. 2006-112248. The transmission taught by Japanese Patent Laid-Open No. 2006-112248 is provided with various kinds of clutches functioning as speed change elements, and the transmission is configured to carry out a speed change operation by engaging and disengaging those clutches. Under an automatic shift mode, an optimal gear of the transmission is determined on the basis of an accelerator operation amount and a vehicle speed with reference to a map. To the contrary, under the manual shift mode, the gear is manually shifted to a higher gear or lower gear stepwise in accordance with a downshifting operation and an upshifting operation of a driver through a shift lever. Specifically, in case of carrying out a downshifting of the transmission, a feedback control of an engine output is carried out while disengaging the clutch to neutralize the transmission thereby adjusting the engine speed to a speed to be attained after the downshifting, and then, the clutch is engaged after synchronizing the engine speed.

However, provided that the speed change ratio of the continuously variable transmission taught by Japanese Patent Laid-Open No. 2006-125602 is changed stepwise as under the manual shift mode taught by Japanese Patent Laid-Open No. 2006-112248, shift shocks may occur during the speed change operation of the continuously variable transmission.

DISCLOSURE OF THE INVENTION

The present invention has been conceived noting the technical problems thus far described. Therefore, an object of the present invention is to provide a drive force control system capable of reducing shocks resulting from changing a speed change ratio of a continuously variable transmission stepwise.

In order to achieve-mentioned object, according to the present invention, there is provided a drive force control system, which is applied to a vehicle in which a continuously variable transmission is connected with an output shaft of an internal combustion engine functioning as a prime mover in a power transmittable manner through a clutch, and which is configured to carry out a control for changing a speed change ratio of the continuously variable transmission stepwise, characterized by comprising: a shifting demand judging means, which is adapted to judge whether or not a torque capacity of the clutch is relatively high, and a condition for changing the speed change ratio of the continuously variable transmission stepwise is satisfied; and a first shifting means, which is adapted to reduce the torque capacity of the clutch before changing the speed change ratio of the continuously variable transmission, to synchronize a rotational speed of the internal combustion engine with an input speed of the continuously variable transmission to be attained after changing the speed change ratio thereof while changing the speed change ratio of the continuously variable transmission, and to increase the torque capacity of the clutch after changing the speed change ratio of the continuously variable transmission, in case the shifting demand judging means judges that the torque capacity of the clutch is relatively high, and a condition for changing the speed change ratio of the continuously variable transmission stepwise is satisfied while the vehicle is running.

The drive force control system further comprises a shock judging means, which is adapted to judge whether or not a shift shock is generated if the speed change ratio of the continuously variable transmission is changed stepwise while the vehicle is running. The aforementioned first shifting means includes a means adapted to reduce the torque capacity of the clutch before changing the speed change ratio of the continuously variable transmission, to synchronize a rotational speed of the internal combustion engine with a rotational speed to be attained after changing the speed change ratio of the continuously variable transmission while changing the speed change ratio of the continuously variable transmission, and to increase the torque capacity of the clutch after changing the speed change ratio of the continuously variable transmission, in case the shifting demand judging means judges that the condition for changing the speed change ratio of the continuously variable transmission stepwise is satisfied, and the shock judging means judges that the shift shock is generated if the speed change ratio of the continuously variable transmission is changed stepwise.

The aforementioned shock judging means includes a means adapted to judge that the shift shock is generated if the speed change ratio of the continuously variable transmission is changed stepwise, on the basis of a fact that a difference between a target input speed of the continuously variable transmission after changing the speed change ratio thereof and a current input speed of the continuously variable transmission is lager than a threshold.

Moreover, the shock judging means includes a means adapted to judge that the shift shock is generated if the speed change ratio of the continuously variable transmission is changed stepwise, on the basis of a fact that the speed change ratio of the continuously variable transmission before changing the speed change ratio thereof is relatively high.

Further, the shock judging means includes a means adapted to judge that the shift shock is generated if the speed change ratio of the continuously variable transmission is changed stepwise, on the basis of a temperature of cooling water for cooling the internal combustion engine, or on the basis of a temperature of operating oil for controlling the speed change ratio of the continuously variable transmission.

According to the present invention, the drive force control system further comprises a condition judging means, which is adapted to judge whether or not the torque capacity of the clutch is allowed to be reduced. The aforementioned first shifting means includes a means adapted to reduce the torque capacity of the clutch, to synchronize the rotational speed of the internal combustion engine with a rotational speed to be attained after changing the speed change ratio of the continuously variable transmission, and to increase the torque capacity of the clutch, in case the shifting demand judging means judges that the condition for changing the speed change ratio of the continuously variable transmission stepwise is satisfied, and the condition judging means judges that the torque capacity of the clutch is allowed to be reduced.

The aforementioned condition judging means includes a means adapted to judge a fact that the torque capacity of the clutch is allowed to be reduced on the basis of a fact that a driver of the vehicle is not carrying out an accelerating operation.

Specifically, according to the present invention, the control for changing a speed change ratio of the continuously variable transmission stepwise includes a downshifting for increasing the speed change ratio of the continuously variable transmission stepwise.

In addition, according to the present invention, the drive force control system further comprises a second shifting means, which is adapted to change the speed change ratio of the continuously variable transmission stepwise without reducing the torque capacity of the clutch, in case the shock judging means judges that the shift shock will not be generated even if the speed change ratio of the continuously variable transmission is changed stepwise while the vehicle is running.

Thus, according to the present invention, the torque capacity of the clutch is reduced before changing the speed change ratio of the continuously variable transmission, and the rotational speed of the internal combustion engine is synchronized during the speed change operation of the continuously variable transmission with the input speed to be achieved after the shifting operation, in case the torque capacity of the clutch is relatively high, and the condition for changing the speed change ratio of the continuously variable transmission stepwise is satisfied when the vehicle is running. Then, the torque capacity of the clutch is increased after the termination of shifting operation of the continuously variable transmission. Therefore, an equivalent inertia weight of the input side will not be increased abruptly in the process of changing the speed change ratio of the continuously variable transmission stepwise. For this reason, the shift shocks of the continuously variable transmission can be damped.

That is, according to the present invention, the above-explained advantage can be achieved in case the shifting demand judging means judges that the condition for changing the speed change ratio of the continuously variable transmission stepwise is satisfied, and the shock judging means judges that the shift shock is generated if the speed change ratio of the continuously variable transmission is changed stepwise.

Specifically, in case the difference between the target input speed of the continuously variable transmission after changing the speed change ratio thereof and the current input speed of the continuously variable transmission is lager than a threshold, the shock judging means judges that the shift shock is generated if the speed change ratio of the continuously variable transmission is changed stepwise. Thus, the above-explained advantage can be achieved.

Alternatively, in case the speed change ratio of the continuously variable transmission before changing the speed change ratio thereof is relatively high, the shock judging means judges that the shift shock is generated if the speed change ratio of the continuously variable transmission is changed stepwise. Consequently, the above-explained advantage can be achieved also in this case.

Further, the shock judging means also capable of judging that the shift shock is generated if the speed change ratio of the continuously variable transmission is changed stepwise, on the basis of a temperature of cooling water for cooling the internal combustion engine, or on the basis of a temperature of operating oil for controlling the speed change ratio of the continuously variable transmission. Therefore, the above-explained advantage can be achieved also in this case.

According to the present invention, the above-explained advantage can also be achieved by reducing the torque capacity of the clutch, synchronizing the rotational speed of the internal combustion engine with a rotational speed to be attained after changing the speed change ratio of the continuously variable transmission, and then increasing the torque capacity of the clutch, in case the condition for changing the speed change ratio of the continuously variable transmission stepwise is satisfied, and the torque capacity of the clutch is allowed to be reduced.

Specifically, according to the present invention, the torque capacity of the clutch is allowed to be reduced in case a driver of the vehicle is not carrying out an accelerating operation. Therefore, the above-explained advantage can be achieved also in this case.

In addition, according to the present invention, the engine braking force will not be boosted abruptly even in case of carrying out the downshifting for increasing the speed change ratio of the continuously variable transmission stepwise. Therefore, the above-explained advantage can be achieved.

In addition to the above-explained advantage, according to the present invention, in case the shift shock will not be generated even if the speed change ratio of the continuously variable transmission is changed stepwise while the vehicle is running, the speed change ratio of the continuously variable transmission is changed stepwise without reducing the torque capacity of the clutch. Therefore, a required time from a commencement to a termination of the shifting operation of the continuously variable transmission can be shortened. For this reason, a response of the speed change operation can be improved.

BEST MODE FOR CARRYING OUT THE INVENTION

The continuously variable transmission to which the present invention is applied is configured to change a speed change ratio thereof not only continuously (i.e., steplessly) but also stepwise (i.e., discontinuously). Specifically, the continuously variable transmission includes: a belt-type continuously variable transmission; a toroidal-type continuously variable transmission; and a continuously variable transmission using a planetary gear mechanism. Meanwhile, the clutch used in the present invention is capable of controlling a transmission torque or a torque capacity thereof, therefore, power can be transmitted and interrupted by the clutch. For example, the clutch is configured to transmit the torque by a frictional force, an electromagnetic force or an engagement force. According to the present invention, a definition of an expression "shift shock" is an abrupt change in a drive torque of the vehicle resulting from a speed change operation of the continuously variable transmission. In the above explanation, a definition of "abrupt change" is a perceivable change in the torque for the driver. Especially, in case of carrying out a downshifting of the continuously variable transmission, a strong engine braking force is generated. As a result, the drive torque is changed significantly in a negative side. Therefore, the present invention is configured to prevent such change in the drive torque resulting from the downshifting.

Next, a vehicle to which the present invention is applied will be explained with reference to FIG. 2. A vehicle 1 is provided with an internal combustion engine 2 functioning as a prime mover for driving the vehicle 1. The internal combustion engine 2 is a power unit configured to convert thermal energy into kinetic energy by combusting a fuel. For example, a gasoline engine, a diesel engine, LPG engine and so on may be used as the internal combustion engine 2. A power of the internal combustion engine 2 is outputted from an output shaft 6, and, a hydraulic power transmission 3 is arranged between the output shaft 6 and an input shaft 10 to transmit the power therebetween by a kinetic energy of the operating oil. In addition, a torque reversing mechanism 4 is interposed between the input shaft 10 and a belt-type continuously variable transmission 5.

The torque reversing mechanism 4 is configured to switch the rotational direction of a primary shaft 16 of the belt-type continuously variable transmission 5 between a rotational direction of the input shaft 10 and a counter direction of the rotational direction of the input shaft 10. In the example shown in FIG. 2, a double-pinion type planetary gear mechanism is used as the torque reversing mechanism 4. Specifically, the torque reversing mechanism 4 comprises a sun gear 17 adapted to rotate together with the input shaft 10, a ring gear 18 arranged coaxially with the sun gear 17, a pinion gear 19 meshing with the sun gear 17, and a pinion gear 20 meshing with the pinion gear 19 and the ring gear 18. Those pinion gears 19 and 20 are held by a carrier 21 in a rotatable and revolvable manner.

In addition, the torque reversing mechanism 4 further comprises: a forward clutch 22 adapted to selectively connect the input shaft 10 with the carrier 21 in a power transmittable manner, and disconnect the input shaft 10 from the carrier 21; and a reverse brake 23 adapted to switch the rotational direction of a primary shaft 16 between the rotational direction of the input shaft 10 and a counter direction of the rotational direction of the input shaft 10 by fixing the ring gear 18 selectively. In this example, hydraulically controlled clutch and brake are used as the forward clutch 22 and the reverse brake 23. Further, a hydraulic chamber 24 is provided to control the torque transmitted by the forward clutch 22, and a hydraulic chamber 25 is provided to control a braking force or a torque capacity of the reverse brake 23. Specifically, the forward clutch 22 is formed by attaching a friction member to an annular plate and a disc, that is, the forward clutch 22 is configured to transmit the power by a frictional force.

Meanwhile, the belt-type continuously variable transmission 5 is configured to vary a speed change ratio between an input speed and an output speed continuously (i.e., steplessly). In the belt-type continuously variable transmission 5, a primary shaft 16 and a secondary shaft 26 are arranged parallel to each other. The primary shaft 16 is rotated integrally with a primary pulley 27, and the secondary shaft 26 is rotated integrally with a secondary pulley 28. The primary pulley 27 comprises a fixed sheave (not shown) which is not allowed to move in an axial direction of the primary shaft 16, and a movable sheave (not shown) which is allowed to move in the axial direction of the primary shaft 16. The movable sheave of the primary pulley 27 is moved by a primary hydraulic chamber 29 in the axial direction of the primary shaft 16 to control a width of a groove between the fixed sheave and the movable sheave. The secondary pulley 28 also comprises a fixed sheave (not shown) which is not allowed to move in an axial direction of the secondary shaft 26, and a movable sheave (not shown) which is allowed to move in the axial direction of the secondary shaft 26. The movable sheave of the secondary pulley 28 is moved by a secondary hydraulic chamber 30 in the axial direction of the secondary shaft 26 to control a width of a groove between the fixed sheave and the movable sheave. A differential 32 is connected with the secondary shaft 26 through a gear transmission 31, and (front) wheels 33 are connected with the differential 32.

Next, a control system of the vehicle 1 shown in FIG. 2 will be explained hereinafter. As shown in FIG. 2, there is provided an electronic control unit (ECU) 34. For example, signals representing a rotation speed of the internal combustion engine 2, a rotation speed of the primary shaft 16, a rotation speed of the secondary shaft 26, a vehicle speed, an acceleration demand, a braking demand, an oil temperature, a temperature of cooling water, an external temperature, a shift position, and signals from a sensor and a switch for detecting a manual shifting operation and so on are inputted to the electronic control unit 34. To the contrary, signals for controlling the internal combustion engine 2, a hydraulic control unit 35 and so on are outputted from the electronic control unit 34. Specifically, an engaging pressure of the forward clutch 22 or the torque transmitted by the forward clutch 22, an engaging pressure of the reverse brake 23 or a braking force of the reverse brake 23, a speed change ratio of the belt-type continuously variable transmission 5, and a torque transmitted by the belt-type continuously variable transmission 5 are controlled by the hydraulic control unit 35. In order to control the above-mentioned elements, various kinds of data are stored in the electronic control unit 34. For example, a map for obtaining a target output of the engine on the basis of a vehicle speed and an acceleration demand, a map for controlling the speed change ratio of the belt-type continuously variable transmission 5, a map for controlling the torque transmitted by the belt-type continuously variable transmission 5 and so on are stored in the electronic control unit 34.

In the vehicle 1 thus structured, the torque outputted from the internal combustion engine 2 is transmitted to the input shaft 10 through the hydraulic power transmission 3. Next, a control of the torque reversing mechanism 4 will be explained hereinafter. In case a shift position is in a forward position, for example, in case D (i.e., Drive) position is selected, the oil pressure in the hydraulic chamber 24 is raised to engage the forward clutch 22, and the oil pressure in the hydraulic chamber 25 is lowered to disengage the reverse brake 23. As a result, the input shaft 10 and the carrier 21 are rotated integrally so that the torque of the input shaft 10 is transmitted to the primary shaft 16.

To the contrary, in case R (i.e., reverse) position is selected, the oil pressure in the hydraulic chamber 24 is lowered to disengage the forward clutch 22, and the oil pressure in the hydraulic chamber 25 is raised to engage the reverse brake 23. That is, the ring gear 18 is fixed. In this situation, when the torque of the internal combustion engine 2 is transmitted to the sun gear 17, the ring gear 18 functions as a reaction element and the torque of the sun gear 17 is transmitted to the primary shaft 16 through the carrier 21. In this case, the primary shaft 16 is rotated in the direction opposite to that of the case in which the forward position is selected. Meanwhile, in case N (i.e., neutral) position or P (i.e., parking) position is selected, both of the forward clutch 22 and the reverse brake 23 are disengaged thereby interrupting a power transmission between the input shaft 10 and the primary shaft 16. Consequently, the torque reversing mechanism 4 is neutralized.

Next, a control of the belt-type continuously variable transmission 5 will be explained hereinafter. As explained, the torque of the internal combustion engine 2 is transmitted to the primary shaft 16, and the speed change ratio of the belt-type continuously variable transmission 5 is controlled on the basis of the signals inputted to the electronic control unit 34 and the data stored in the electronic control unit 34. In addition to the above-mentioned control of the speed change ratio, a torque capacity of the belt-type continuously variable transmission 5 is also controlled. Specifically, the speed change ratio of the belt-type continuously variable transmission 5 is controlled using the signals representing the vehicle speed and the opening degree of the accelerator. First of all, a control of the speed change ratio of the belt-type continuously variable transmission 5 will be explained hereinafter. When the groove width of the primary pulley 27 is changed, a radius of a belt 36 applied to the primary pulley 27 is varied continuously thereby changing the speed change ratio continuously. Specifically, in case a feeding amount of the operating oil to the primary hydraulic chamber 29 is increased thereby raising the oil pressure in the primary hydraulic chamber 29, the radius of the belt 36 on the primary pulley 27 is increased. As a result, the speed change ratio of the belt-type continuously variable transmission 5 is decreased, in other words, an upshifting of the belt-type continuously variable transmission 5 is achieved.

To the contrary, in case the feeding amount of the operating oil to the primary hydraulic chamber 29 is decreased thereby lowering the oil pressure in the primary hydraulic chamber 29, the radius of the belt 36 on the primary pulley 27 is reduced. As a result, the speed change ratio of the belt-type continuously variable transmission 5 is increased, in other words, a downshifting of the belt-type continuously variable transmission 5 is achieved. In case the feeding amount of the oil to the primary hydraulic chamber 29 is kept constant thereby keeping the oil pressure in the primary hydraulic chamber 29 to a constant value, the radius of the belt 36 on the primary pulley 27 is kept to a constant radius. That is, the speed change ratio of the belt-type continuously variable transmission 5 is kept to a constant ratio.

Meanwhile, a clamping pressure of the secondary pulley 28 to clump the belt 36 is adjusted. Specifically, in case the oil pressure in the secondary hydraulic chamber 30 is raised, the clamping pressure of the secondary pulley 28 to clump the belt 36 is increased so that the torque transmitted by the belt-type continuously variable transmission 5 is increased. To the contrary, in case the oil pressure in the secondary hydraulic chamber 30 is lowered, the clamping pressure of the secondary pulley 28 to clump the belt 36 is reduced, and the torque transmitted by the belt-type continuously variable transmission 5 is thereby decreased. In case the oil pressure in the secondary hydraulic chamber 30 is kept to the constant pressure, the torque is transmitted by the belt-type continuously variable transmission 5 at a constant rate. The torque transmitted by the belt 36 between the primary pulley 27 and the secondary pulley 28 is thus controlled.

According to the example, the speed change ratio of the belt-type continuously variable transmission 5 can be controlled automatically on the basis of the signals representing the vehicle speed and the opening degree of the accelerator, and the map for controlling the speed change ratio. In addition, according to the example, the speed change ratio of the belt-type continuously variable transmission 5 can be changed stepwise (i.e., discontinuously) in accordance with the factors other than the vehicle speed and the opening degree of the accelerator. Specifically, the speed change ratio of the belt-type continuously variable transmission 5 can be changed stepwise by a manual shifting operation of the driver. In this example, the control for changing the speed change ratio of the belt-type continuously variable transmission 5 stepwise will be called a "stepwise shifting operation" hereinafter. The stepwise shifting includes both of downshifting for increasing the speed change ratio of the belt-type continuously variable transmission 5 relatively, and upshifting for decreasing the speed change ratio of the belt-type continuously variable transmission 5 relatively.

The vehicle thus provided with the continuously variable transmission is structurally capable of changing the speed change ratio of the continuously variable transmission without interrupting power transmission from the internal combustion engine to the wheels. Therefore, an amount of time from a time point when starting to change the speed change ratio of the continuously variable transmission to a termination of a speed change operation can be shortened relatively.

However, in case of carrying out the downshifting relatively quickly without interrupting power transmission from the engine to the wheels, an equivalent inertia weight of the input shaft is increased. Therefore, in case of thus carrying out the downshifting of the continuously variable transmission, the engine braking force is increased abruptly thereby generating perceivable shift shocks.

According to the example, such abrupt raise of the engine braking force during the downshifting of the belt-type continuously variable transmission 5 is prevented by interrupting power transmission between the internal combustion engine 2 and the belt-type continuously variable transmission 5 when carrying out the aforementioned stepwise shifting operation. More specifically, the torque reversing mechanism 4 is neutralized during a shifting operation of the belt-type continuously variable transmission 5, and enabled to transmit the power after termination of downshifting. Hereinafter, a first control example for manually carrying out the stepwise shifting operation of the belt-type continuously variable transmission 5 will be explained with reference to FIG. 1.

Figure 1:
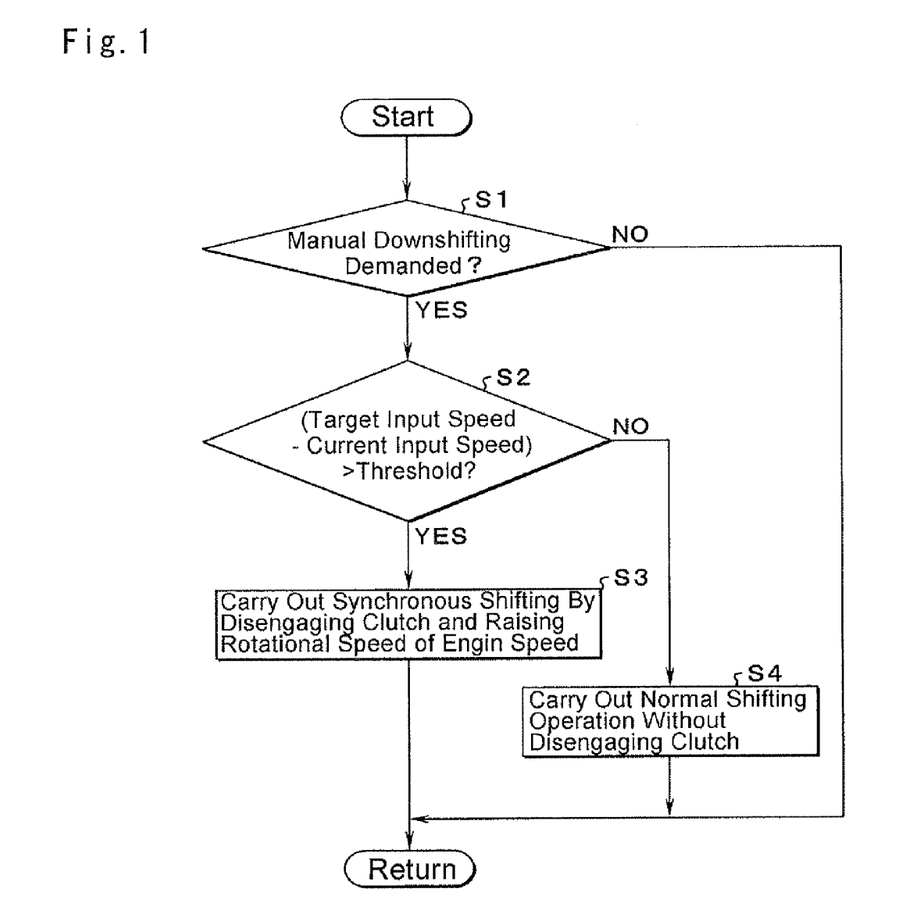
FIG. 1 is a flow chart explaining a first control example carried out in a vehicle to which the present invention is applied.

First of all, in case the vehicle 1 is running under the condition in which a shift position of is in the drive position, the forward clutch 22 is engaged, the reverse brake 23 is disengaged, and an acceleration of the vehicle 1 is not demanded, it is judged whether or not a downshifting is demanded by a manual operation (at step S1). Specifically, if an accelerator pedal is not depressed in this situation, the answer of step S1 is NO. That is, at step S1, it is judged whether or not the downshifting is carried out manually under the situation in which the vehicle 1 is coasting and an engine braking force is being established by a kinetic energy of the vehicle 1 transmitted to the internal combustion engine 2.

In case the answer of step S1 is YES, it is judged whether or not a difference between a target input speed and a current input speed of the belt-type continuously variable transmission 5 is larger than a threshold a stored in the electronic control unit 34 (at step S2). Specifically, the target input speed is an input speed of the belt-type continuously variable transmission 5 after the downshifting, and data on the target input speed is stored in the electronic control unit 34 in the form of map prepared on the basis of the vehicle speed, the speed change ratio and so on. Meanwhile, the threshold a is a criterion value for judging whether or not the engine braking force is boosted abruptly if the stepwise shifting operation of the belt-type continuously variable transmission 5 is carried out under the condition in which the power transmission route between the internal combustion engine 2 and the belt-type continuously variable transmission 5 is connected. Specifically, the threshold a is obtained by experiment or simulation, and stored in the electronic control unit 34.

In case the answer of step S2 is YES, the engine braking force may be boosted abruptly thereby generating perceivable shift shocks, if the stepwise shifting operation of the belt-type continuously variable transmission 5 is carried out while connecting the power transmission route between the internal combustion engine 2 and the belt-type continuously variable transmission 5. Therefore, in case the answer of step S2 is YES, the routine advances to carry out a control of step S3, and then returned. Specifically, a synchronous shifting control (i.e., a blipping control) is carried out at step S3. A procedure of the synchronous shifting will be explained hereinafter. First of all, the torque reversing mechanism 4 is neutralized by disengaging the forward clutch 22 before the commencement of the stepwise shifting operation of the belt-type continuously variable transmission 5. Then, the rotational speed of the internal combustion engine 2 is raised during the stepwise shifting operation of the belt-type continuously variable transmission 5. Specifically, an actual speed of the internal combustion engine 2 is raised to (i.e., synchronized with) the target speed corresponding to the speed change ratio of the belt-type continuously variable transmission 5 to be achieved after the downshifting. Then, the forward clutch 22 is engaged after the termination of downshifting of the continuously variable transmission 5.

To the contrary, in case the answer of step S2 is NO, perceivable shift shock will not be generated even if the stepwise shifting operation of the belt-type continuously variable transmission 5 is carried out while connecting the power transmission route between the internal combustion engine 2 and the belt-type continuously variable transmission 5. Therefore, in case the answer of step S2 is NO, a normal shifting operation is carried out (at step S4) and the routine is then returned. Specifically, at step S4, the stepwise downshifting of the belt-type continuously variable transmission 5 is carried out while engaging the forward clutch 22. In addition, in case the answer of step S1 is NO, the routine is returned directly.

Figure 3:
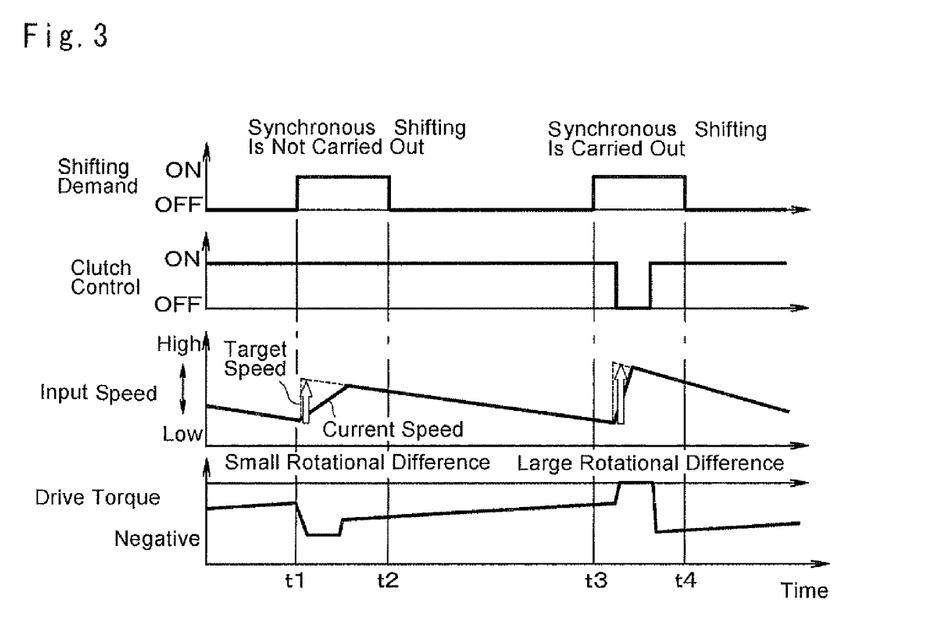
FIG. 3 is a time chart corresponding to the control example shown in FIG. 1.

An example of a time chart corresponding to the control of FIG. 1 is shown in FIG. 3. As shown in FIG. 3, the downshifting is not demanded (as indicated by "OFF") and the forward clutch 22 is engaged (as indicated by "ON") before a time point t1. In this situation, the current input speed indicated by a solid line is being lowered and the vehicle 1 is coasting, therefore, a negative driving torque is being generated by the engine braking force. Then, at the time point t1, the downshifting is demanded by a manual operation. However, in this situation, a difference between the target input speed indicated by a broken line and the current input speed is smaller than the threshold α (as indicated by "small rotational difference"). Therefore, the normal shifting operation is demanded to be carried out (as indicated by "ON") during the period from t1 to t2. As described, the torque reversing mechanism 4 is enabled to transmit the power under the normal shifting operation. Therefore, during the period from t1 to t2, the engine braking force is boosted thereby increasing the drive torque in the negative side. Then, the drive torque is decreased in the negative side.

After that, the difference between the target input speed and the current input speed becomes larger than the threshold α (as indicated by "large rotational difference") during the period from t3 to t4. Therefore, when the downshifting is demanded at the time point t3 by a manual shifting operation, the synchronous shifting operation is carried out (as indicated by "ON") during the period from t3 to t4. In this case, the forward clutch 22 of the torque reversing mechanism 4 is disengaged (as indicated by "OFF") during the period from t3 to t4. As a result, the engine braking force is weakened and the drive torque is thereby reduced in the negative side. Then, when the forward clutch 22 is engaged, the engine braking force is boosted and the drive torque is thereby increased in the negative side.

Thus, according to the control example shown in FIG. 1, the routine advances to step S3 to carry out the synchronous shifting operation in case the engine braking force is boosted by carrying out the stepwise shifting operation of the belt-type continuously variable transmission 5. Therefore, an occurrence of perceivable shift shocks can be prevented. To the contrary, in case the perceivable shift shocks will not be generated even if the stepwise shifting operation of the belt-type continuously variable transmission 5 is carried out, the routine advances to step S4 to carry out the normal shifting operation. In other words, the synchronous shifting operation will not be carried out unnecessarily. Therefore, an amount of time from the commencement to the termination of the shifting operation of the belt-type continuously variable transmission 5 can be shortened relatively. In addition, the control example shown in FIG. 1 judges to carry out the synchronous shifting operation or not on the basis of the deference between the target input speed and the current input speed, instead of the speed change ratio of the belt-type continuously variable transmission 5. Therefore, the synchronous shifting operation is not carried out unnecessarily under the situation in which the vehicle 1 is running at a low speed and the speed change ratio of the belt-type continuously variable transmission 5 is therefore large.

Here will be explained a corresponding relation between the present invention and functional means of the control example shown in FIG. 1. Specifically, step S1 corresponds to the shifting demand judging means and the condition judging means, step S2 corresponds to the shock judging means, step S3 corresponds to the first shifting means, and step S4 corresponds to the second shifting means.

Next, here will be explained a second control example for carrying out the stepwise shifting operation of the belt-type continuously variable transmission 5 by a manual shifting operation with reference to FIG. 4. In the control example shown in FIG. 4, common step numbers are allotted to the steps for carrying out the controls in common with those of the control example shown in FIG. 1. According to the control example shown in FIG. 4, in case the answer of step S1 is YES, the routine advances to step S5 to judge whether or not the shift shocks are generated if the stepwise speed change operation of the belt-type continuously variable transmission 5 is carried out. Such judgment at step S5 is to be made on the basis of a temperature of operating oil for engaging and disengaging the forward clutch 22. Specifically, in case the oil temperature is higher than a threshold $\beta$ but lower than a threshold $\gamma$, the answer of the judgment at step S5 is YES. In this case, since the oil temperature is higher than the threshold $\beta$, viscosity of the operating oil is relatively low so that the forward clutch 22 can be smoothly engaged and disengaged without causing shocks. In addition, since the oil temperature is lower than the threshold $\gamma$, leakage of the operating oil is relatively small so that the forward clutch 22 can be engaged and disengaged promptly. Therefore, in case the answer of step S5 is YES, the routine advances to step S3.

To the contrary, in the oil temperature is lower than the threshold $\beta$, or higher than the threshold $\gamma$, the answer of the judgment at step S5 is NO. In this case, since the oil temperature is lower than the threshold $\beta$, the viscosity of the operating oil is relatively high. Therefore, the forward clutch 22 cannot be engaged and disengaged smoothly without causing shocks. Moreover, since the oil temperature is higher than the threshold $\gamma$, an amount of the oil leakage is relatively large. Therefore, the forward clutch 22 cannot be engaged and disengaged promptly. In case the answer of step S5 is NO, the routine advances to step S4.

Figure 4:
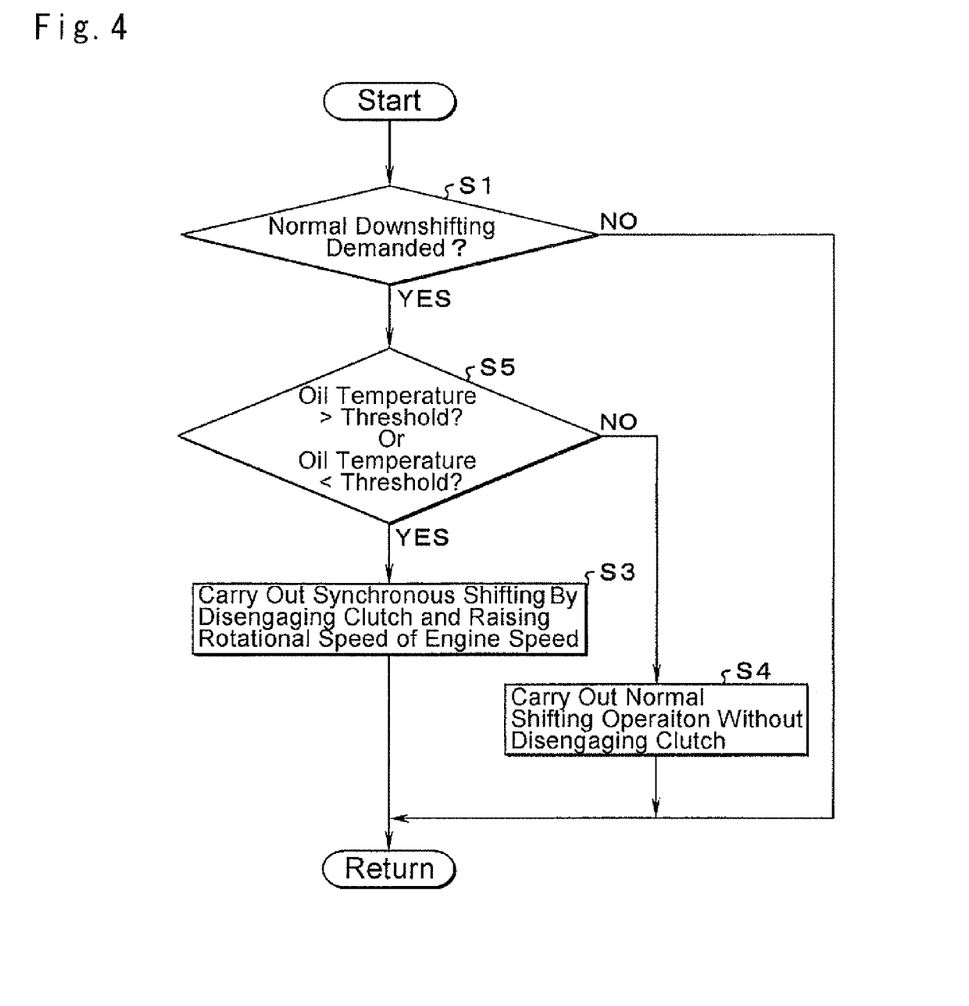
FIG. 4 is a flow chart explaining a second control example carried out in a vehicle to which the present invention is applied.
Figure 5:
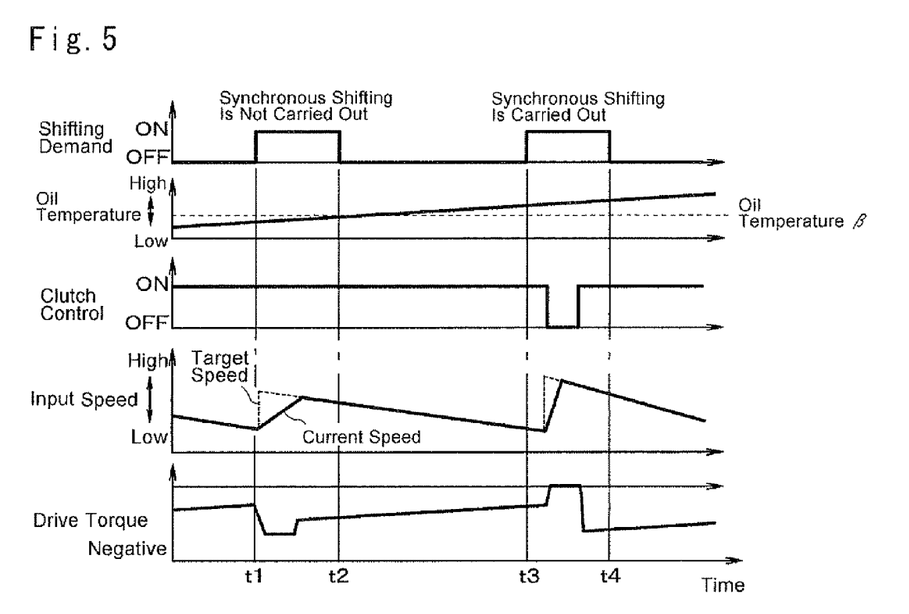
FIG. 5 is a time chart corresponding to the control example shown in FIG. 4.

An example of a time chart corresponding to the control of FIG. 4 is shown in FIG. 5. In the time chart shown in FIG. 5, explanations for factors in common with those in the time chart shown in FIG. 3 will be omitted. Specifically, a chronological change in the oil temperature is indicated in FIG. 5. In FIG. 5, the threshold $\beta$ is indicated but the threshold $\gamma$ is not indicated for the sake of convenience. As shown in FIG. 5, the oil temperature is lower than the threshold $\beta$ before the time point t2, therefore, the normal shifting operation is carried out before the time point t2. However, the oil temperature exceeds the threshold $\beta$ after the time point t2, therefore, the synchronous shifting operation is carried out after the time point t2.

According to the control example shown in FIG. 4, the advantages of the control example shown in FIG. 1 can also be achieved by the control steps in common with those in the control example shown in FIG. 1. However, according to the control example shown in FIG. 4, the synchronous shifting operation is carried out under the condition in which the forward clutch 22 can be operated stably without causing shocks. To the contrary, in case the answer of step S5 is NO, that is, in case a use frequency of the oil is not frequently enough and the oil temperature is therefore too low, or in case the oil temperature is too high, the normal shifting operation can be carried out instead of the synchronous shifting operation. Therefore, the shifting operation can be carried out stably under any kind of temperature conditions.

Alternatively, possibility of occurrence of shocks may also be judged at step S5 of the control shown in FIG. 4 on the basis of a temperature of cooling water for cooling the internal combustion engine instead of the oil temperature. In this case, degree of increase in the rotational speed of the engine is indirectly judged on the basis of the temperature of the cooling water. Specifically, in case the temperature of the cooling water is higher than a threshold, answer of step S5 is YES, and to the contrary, in case temperature of the cooling water is lower than the threshold, answer of step S5 is NO. That is, in case a combustion state of the internal combustion engine 2 is preferable so that the rotational speed thereof can be controlled accurately, the routine advances to step S3. To the contrary, in case the combustion state of the internal combustion engine 2 is unstable, the routine advances to step S4. Thus, the above-explained advantages can also be achieved in case of using the temperature of the cooling water as the criterion of the judgment.

Here will be explained a corresponding relation between the present invention and functional means of the control example shown in FIG. 4. Specifically, step S5 corresponds to the shock judging means. The corresponding relations between the present invention and the remaining functional means of the control example shown in FIG. 4 are identical to those between the present invention and the control example shown in FIG. 1.

Next, here will be explained a third control example for carrying out the stepwise shifting operation of the belt-type continuously variable transmission 5 by a manual shifting operation with reference to FIG. 6. In the control example shown in FIG. 6, common step numbers are allotted to the steps for carrying out the controls in common with those of the control example shown in FIG. 1. According to the control example shown in FIG. 6, the acceleration demand is not judged at step S1. Instead, in case the answer of step S1 is YES, an existence of the acceleration demand is judged (at step S6). Specifically, in case the accelerator pedal is not depressed (i.e., in case an acceleration=zero), the answer of step S6 is YES, and the routine advances to step S3. To the contrary, in case the accelerator pedal is depressed, the answer of step S6 is NO, and the routine advances to step S4.

Figure 6:
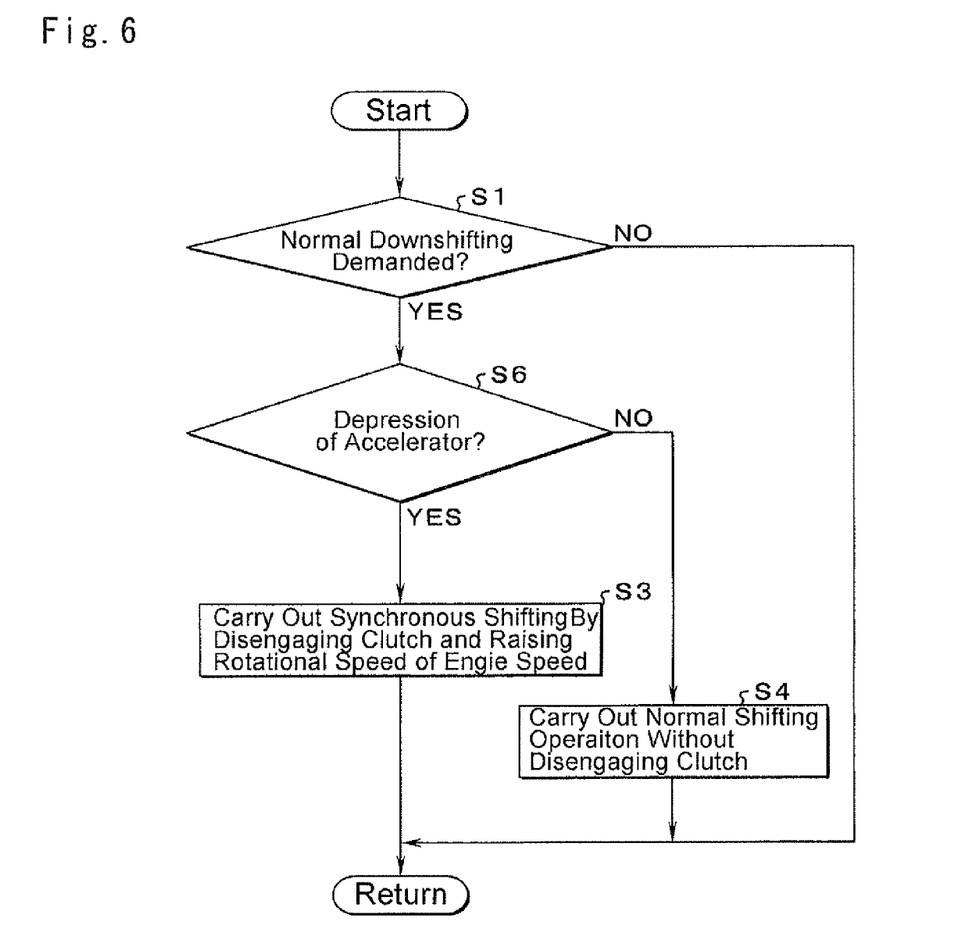
FIG. 6 is a flow chart explaining a third control example carried out in a vehicle to which the present invention is applied.
Figure 7:
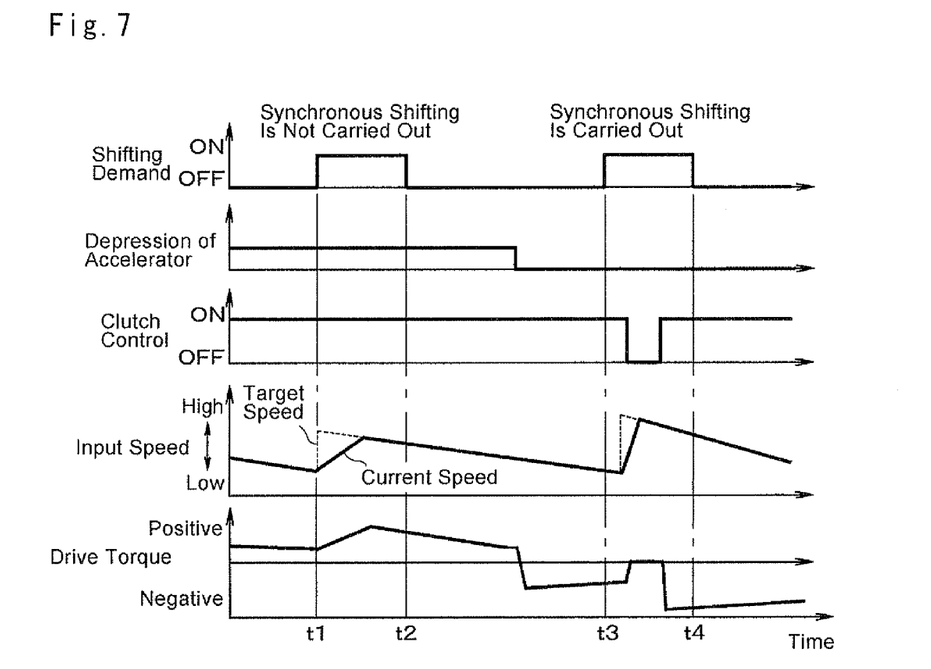
FIG. 7 is a time chart corresponding to the control example shown in FIG. 6.

An example of a time chart corresponding to the control of FIG. 6 is shown in FIG. 7. In the time chart shown in FIG. 7, explanations for the factors in common with those in the time chart shown in FIG. 3 will be omitted. In the time chart shown in FIG. 7, the accelerator pedal is depressed before the time point t1. Therefore, before the time point t1, the torque of the internal combustion engine 2 is being transmitted to the wheel 33 so that positive drive torque is being generated. Then, the normal shifting operation is carried out during the period from t1 to t2. In this situation, since the forward clutch 22 is engaged, the drive torque is raised in the positive side. After that, the accelerator pedal is returned during the period from t2 to t3 and the vehicle 1 starts coasting. Therefore, in this situation, a negative drive force is generated by the engine braking force. Then, the synchronous shifting operation is carried out during the period from t3 to t4.

Thus, according to the control example shown in FIG. 6, the advantages of the control example shown in FIG. 1 can also be achieved by the control steps in common with those in the control example shown in FIG. 1. However, according to the control example shown in FIG. 6, the synchronous shifting operation is carried out under the condition in which the accelerator pedal is not depressed. Specifically, in case the driver has an intention to accelerate the vehicle 1 and depress the accelerator pedal, the torque reversing mechanism 4 is kept to a condition to transmit the power. Therefore, in this case, the forward driving torque can be maintained so that the vehicle 1 can be accelerated. To the contrary, in case the driver does not have an intention to accelerate the vehicle 1 and the accelerator pedal is not depressed, the synchronous shifting operation is carried out while neutralizing the torque reversing mechanism 4. Therefore, in this case, the drivability will not be deteriorated even if the driving force is interrupted.

Here will be explained a corresponding relation between the present invention and functional means of the control example shown in FIG. 6. Specifically, step S6 corresponds to the condition judging means. The corresponding relations between the present invention and the remaining functional means of the control example shown in FIG. 6 are identical to those between the present invention and the control example shown in FIG. 1.

Figure 8:
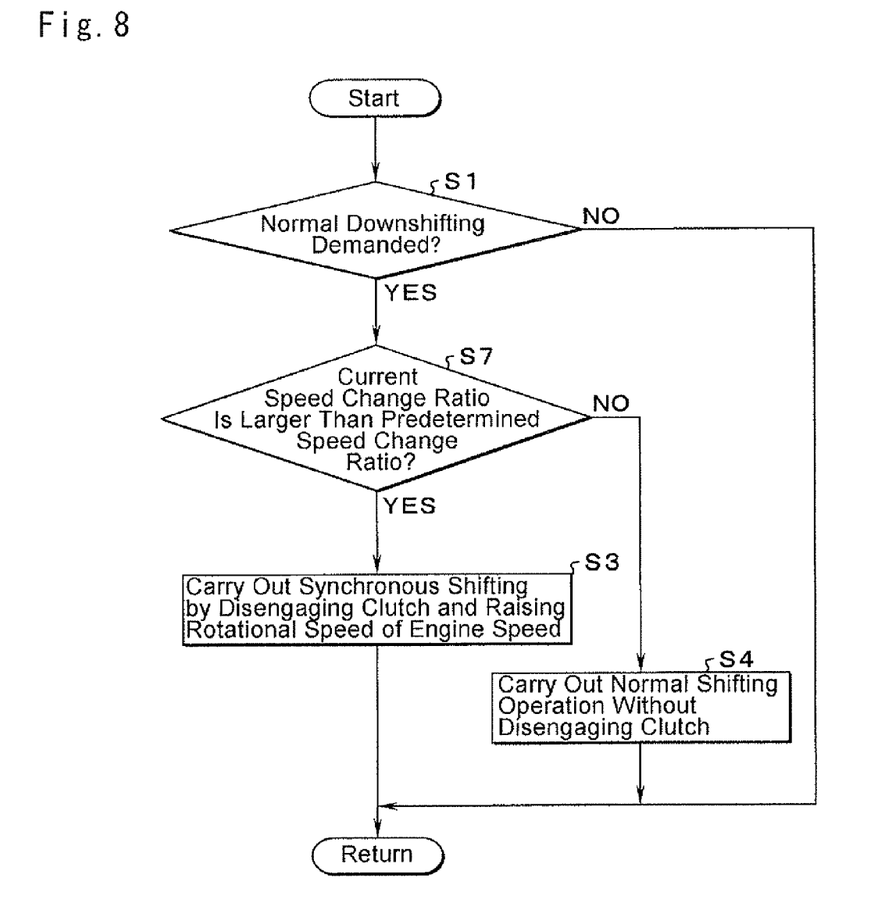
FIG. 8 is a flow chart explaining a fourth control example carried out in a vehicle to which the present invention is applied.

Next, here will be explained a forth control example for carrying out the stepwise shifting operation of the belt-type continuously variable transmission 5 by a manual shifting operation with reference to FIG. 8. In the control example shown in FIG. 8, common step numbers are allotted to the steps for carrying out the controls in common with those of the control example shown in FIG. 1. According to the control example shown in FIG. 8, in case the answer of step S1 is YES, the routine advances to step S7 to judge whether or not the current speed change ratio of the belt-type continuously variable transmission 5 is larger than a predetermined speed change ratio. Specifically, the predetermined speed change ratio is a threshold used to judge whether or not the engine braking force is boosted abruptly if the stepwise shifting operation of the belt-type continuously variable transmission 5 is carried out while connecting the power transmission route between the internal combustion engine 2 and the belt-type continuously variable transmission 5.

In case the answer of step S7 is YES, the engine braking force is boosted abruptly by carrying out the stepwise shifting operation of the belt-type continuously variable transmission 5 while connecting the power transmission route between the internal combustion engine 2 and the belt-type continuously variable transmission 5. Therefore, in this case, the routine advances to step S3. To the contrary, in case the answer of step S7 is NO, the engine braking force will not be boosted abruptly even if the stepwise speed change operation of the belt-type continuously variable transmission 5 is carried out while connecting the power transmission route between the internal combustion engine 2 and the belt-type continuously variable transmission 5. Therefore, in this case, the routine advances to step S4. A time chart of the case in which the control example shown in FIG. 8 is carried out is identical to the time chart shown in FIG. 3 except for the input speed.

Here will be explained a corresponding relation between the present invention and functional means of the control example shown in FIG. 8. Specifically, step S7 corresponds to the shock judging means. The corresponding relations between the present invention and the remaining functional means of the control example shown in FIG. 8 are identical to those between the present invention and the control example shown in FIG. 1.

Figure 2:
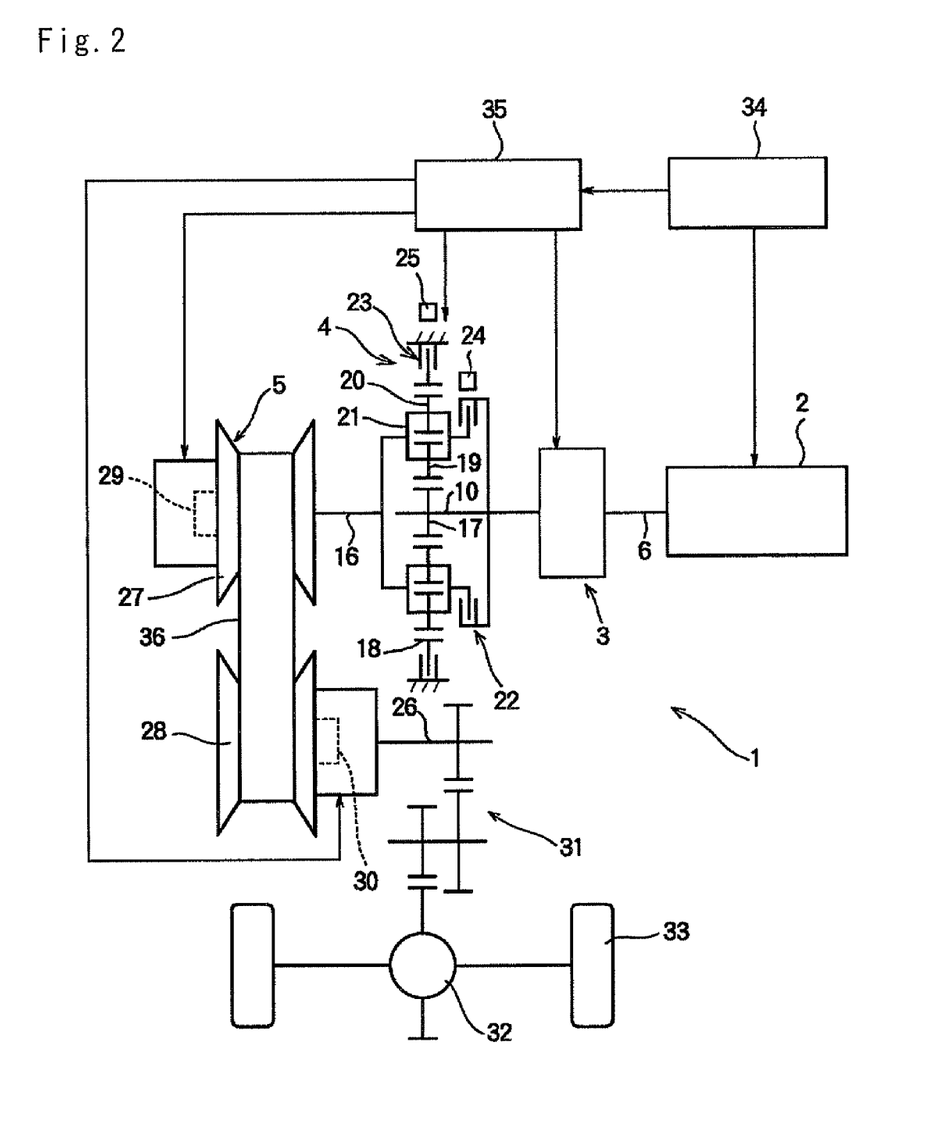
FIG. 2 is a view schematically showing a structure of the vehicle to which the present invention is applied.

Each of the controls according to the present invention may also be applied to a modified vehicle 1 shown in FIG. 2 using a toroidal type-continuously variable transmission instead of the belt-type continuously variable transmission 5. In addition, the controls according to the present invention may also be applied to a vehicle in which a mechanism for reversing the rotational direction of the input element of the continuously variable transmission is not arranged between the continuously variable transmission and the engine, but which is provided with: a starting clutch (not shown) adapted to transmit the power and to interrupt the power; and a torque reversing mechanism arranged between the continuously variable transmission and the wheel. In this case, the starting clutch arranged between continuously variable transmission and the engine is disengaged under the synchronous shifting operation, and engaged after the termination of the shifting operation of the continuously variable transmission. Further, a clutch configured to transmit the power electromagnetically may also be used as the forward clutch 22 of the torque reversing mechanism 4 or the not shown starting clutch, instead of the clutch configured to transmit the power frictionally.

The invention claimed is:

1. A drive force control system, which is applied to a vehicle having an internal combustion engine functioning as a prime mover and a continuously variable transmission arranged in an output side of the internal combustion engine to which power of the internal combustion engine is transmitted, and which is configured to carry out a control for changing a speed change ratio of the continuously variable transmission stepwise, comprising:
   a torque reversing mechanism having a forward clutch and a reverse brake, which is configured to transmit the power outputted from the internal combustion engine to the continuously variable transmission without changing a direction of torque by engaging the forward clutch and disengaging the reverse brake, and to transmit the power outputted from the internal combustion engine to the continuously variable transmission while reversing the direction of torque by engaging the reverse brake and disengaging the forward clutch;
   a shifting demand judging means, which is adapted to judge whether or not a torque capacity of the forward clutch is relatively high, and a condition for changing the speed change ratio of the continuously variable transmission stepwise is satisfied;
   a first shifting means, which is adapted to reduce the torque capacity of the forward clutch before changing the speed change ratio of the continuously variable transmission, to synchronize a rotational speed of the internal combustion engine with an input speed of the continuously variable transmission to be attained after changing the speed change ratio thereof while changing the speed change ratio of the continuously variable transmission, and to increase the torque capacity of the forward clutch after changing the speed change ratio of the continuously variable transmission, in case the shifting demand judging means judges that the torque capacity of the forward clutch is relatively high, and a condition for changing the speed change ratio of the continuously variable transmission stepwise is satisfied while the vehicle is running; and a condition judging means, which is adapted to judge whether or not the torque capacity of the forward clutch is allowed to be reduced, wherein:

the first shifting means includes a means adapted to reduce the torque capacity of the forward clutch, to synchronize the rotational speed of the internal combustion engine with a rotational speed to be attained after changing the speed change ratio of the continuously variable transmission, and to increase the torque capacity of the forward clutch, in case the shifting demand judging means judges that the condition for changing the speed change ratio of the continuously variable transmission stepwise is satisfied, and the condition judging means judges that the torque capacity of the forward clutch is allowed to be reduced, and the condition judging means includes a means adapted to judge a fact that the torque capacity of the forward clutch is allowed to be reduced on the basis of a fact that a driver of the vehicle is not carrying out an accelerating operation.

2. The drive force control system as claimed in claim 1, wherein:

the control for changing a speed change ratio of the continuously variable transmission stepwise includes a downshifting for increasing the speed change ratio of the continuously variable transmission stepwise.

3. A drive force control system, which is applied to a vehicle in which a continuously variable transmission is connected with an output shaft of an internal combustion engine functioning as a prime mover in a power transmittable manner through a clutch, and which is configured to carry out a control for changing a speed change ratio of the continuously variable transmission stepwise, comprising:

a shifting demand judging means, which is adapted to judge whether or not a torque capacity of the clutch is relatively high, and a condition for changing the speed change ratio of the continuously variable transmission stepwise is satisfied;

a first shifting means, which is adapted to reduce the torque capacity of the clutch before changing the speed change ratio of the continuously variable transmission, to synchronize a rotational speed of the internal combustion engine with an input speed of the continuously variable transmission to be attained after changing the speed change ratio thereof while changing the speed change ratio of the continuously variable transmission, and to increase the torque capacity of the clutch after changing the speed change ratio of the continuously variable transmission, in case the shifting demand judging means judges that the torque capacity of the clutch is relatively high, and a condition for changing the speed change ratio of the continuously variable transmission stepwise is satisfied while the vehicle is running;

a condition judging means, which is adapted to judge whether or not the torque capacity of the clutch is allowed to be reduced;

wherein the first shifting means includes a means adapted to reduce the torque capacity of the clutch, to synchronize the rotational speed of the internal combustion engine with a rotational speed to be attained after changing the speed change ratio of the continuously variable transmission, and to increase the torque capacity of the clutch, in case the shifting demand judging means judges that the condition for changing the speed change ratio of the continuously variable transmission stepwise is satisfied, and the condition judging means judges that the torque capacity of the forward clutch is allowed to be reduced; and wherein the condition judging means includes a means adapted to judge a fact that the torque capacity of the clutch is allowed to be reduced on the basis of a fact that a driver of the vehicle is not carrying out an accelerating operation.

4. The drive force control system as claimed in claim 3, wherein:

the control for changing a speed change ratio of the continuously variable transmission stepwise includes a downshifting for increasing the speed change ratio of the continuously variable transmission stepwise.

\* \* \* \* \*